United States Patent [19]
Bederson et al.

[11] Patent Number: 5,204,573
[45] Date of Patent: Apr. 20, 1993

[54] TWO-DIMENSIONAL POINTING MOTOR

[75] Inventors: Benjamin B. Bederson; Richard S. Wallace; Eric L. Schwartz, all of New York, N.Y.

[73] Assignee: Vision Applications, Inc., Allston, Mass.

[21] Appl. No.: 731,639

[22] Filed: Jul. 17, 1991

[51] Int. Cl.$^5$ .............................................. H02K 3/00
[52] U.S. Cl. ....................... 310/198; 310/68 R; 310/91; 310/154; 310/156; 248/183; 901/23
[58] Field of Search ............... 310/90.5, 74, 42, 266, 310/153, 154, 156, 181, 198, 203, 91, 208, 177, 166, 68 R, 261; 354/70; 248/183; 901/23, 28

[56] References Cited

U.S. PATENT DOCUMENTS

| | | | |
|---|---|---|---|
| 3,178,600 | 4/1965 | Bers | 310/166 |
| 3,875,488 | 4/1975 | Crocker | 318/648 |
| 4,316,394 | 2/1982 | Dohogne | 310/90.5 |
| 4,398,878 | 8/1983 | Cole | 318/648 |
| 4,785,212 | 11/1988 | Downer | 310/90.5 |
| 4,862,050 | 8/1989 | Parfomak | 318/689 |
| 4,868,434 | 9/1989 | Hayashi | 310/266 |
| 4,961,352 | 10/1990 | Downer | 310/90.5 |

OTHER PUBLICATIONS

"Spherical Electric Motors", by A. Miles, IEEE Potentials, Oct. 1990, No. 0278-6648/90/00/0010-0647.

Primary Examiner—R. Skudy
Attorney, Agent, or Firm—Eliot S. Gerber

[57] ABSTRACT

A 2-D pointer motor provides for panning (sideways actuate motion) and tilt (yaw motion) and may be made smaller than one-cubic inch. The motor is preferably controlled by a microcomputer based controller using pulse-width modulation (PWM) to separately control each of its three coils. The coils are arranged orthogonally to provide a single unified torque vector which turns the rotor and accurately points it in the desired directions. The motor is especially adapted to carry a sensor such as a CCD array.

17 Claims, 8 Drawing Sheets

Coil A
(Home Position)

Coil B
(Up/Down)

Coil C
(Left/Right)

FIG 1A

Coil A (Home Position)    Coil B (Up/Down)    Coil C (Left/Right)

Coil A
(Home Position)

Coil B
(Up/Down)

Coil C
(Left/Right)

Coil A

Coil B

Coil C

TWO-DIMENSIONAL POINTING MOTOR

This invention was made with Government support under contract number DARPA N00014-90-C-0049 awarded by The Department of Defense. The Government has certain rights in this invention.

BACKGROUND OF THE INVENTION

Field of the Invention

The present invention relates to pointing motors, which are generally used to point a small electronic device by moving a platform in a panning direction and in a tilting (yaw) direction.

Related Art

At the present time, point (or "pointing") motors are used in a variety of applications, particularly in the fields of military missiles and robotics. For example, in the nose cone of a heat seeking missile, a pointing motor is used to point the heat detecting sensor toward the heat source and to follow the heat source as it moves. The heat detector is mounted on a gimbal arrangement in which the detector is fixed on a first axle which is rotated, generally in an arc of less then 90°, by a first motor (for tilting). That first axle is mounted on a second axle, perpendicular to the first axle, which is rotated, generally less than 90°, by a second motor. The two motors are separately controlled and activated so that the rotation of the first axle causes the heat detector to tilt (yaw movement) and rotation of the second motor causes the heat detector to pan, (actuate sideways movement). That mechanism is relatively large due to its gimbal (double axle) mechanism, its two motors, and the two controllers necessary to control the motors.

In addition, in another type of pointing system, it is common to mount a camera on a pan-tilt actuator, for example in active machine vision systems. Traditional pan-tilt mechanisms use a conventional video camera mounted on a gimbal similar to the previous example. Such mechanisms are based on serial linkages and are asymmetrical as they have two stages where one motor turns one stage, which carries the second motor that turns the second stage.

The general field of motors and motor controls is a crowded field encompassing many thousands of patents, technical articles and devices. A few of those patents and articles have used the term "spherical motor". That term, as generally used in those patents and articles, refers to the shape of the rotor, which is generally spherical, and not to the direction of motion of the rotor. Generally the rotors, as in conventional motors, move cylindrically about a single axis. That type of spherical motor is not useful as a pointing motor because it can only revolve about its axis and provide only a tilting, or alternatively a panning action, but not both types of motion.

In U.S. Pat. No. 3,178,600 to Bers, entitled "Motor Structure Including Spherical Windings", a function generator for producing signals representing a trigonometric function of angular displacement includes a spherical rotor which rotates on a single axle.

In the article "Spherical Electric Motors", A. Miles, IEEE Potentials (October 1990, No. 0278-6648/90/0010-0647) a spherical motor is described which rotates on a single axle and has an angled magnetic field.

SUMMARY OF THE INVENTION

The present invention relates to a pointing motor capable of two-dimensional ("2D") movement, for example it both tilts (yaw) and pans.

A detector, such as a heat detector or video camera photosensor array (CCD image sensor), may be located on the motor's rotor and may be pointed in any tilt or pan direction by the motor, within the two arcs of movement. The motor is controlled by DC currents and preferably under control of an electronic system based on a microcomputer.

The 2D motor uses three orthogonal coils and a permanent magnetic field, where the coil can move with respect to the magnet (internal coil motor) or the magnet with respect to the coils (external coil motor). By passing different currents through the three coils, an electromagnetic field is created whose orientation is dependent on the ratio of the currents in the three coils. A force will then act on the permanent magnet and the coil to align the two fields into the position of lowest potential energy.

It is not necessary, but it is preferred that the three coils be orthogonal. It is sufficient that they be linearly independent as any position would still be attainable. However, if the coils are not orthogonal, different positions would have more widely varying torques, and the currents associated with each position would be more difficult to compute.

The permanent magnetic field may be generated by a coil instead of a permanent magnet, but a coil is not preferred as it would be inefficient.

The motor may be made arbitrarily small, but the torque decreases with $l^2$ where l is the length of a side of the motor. One application involves moving a small CCD-based camera which is less than 0.5" cube and weighs less than 0.5 oz. which may be actuated at speeds of at least 300°/sec The motor preferably is less than about a 2.25" cube, in size, and most preferably about a 1.5" cube.

The DC motor (called by the inventors the "Spherical 2-D Motor") is an absolute positioning device. The final position is determined as an equilibrium position set by the currents to the three coils. It consists of three coils and a fixed magnetic field created by permanent rare-earth magnets. There are two designs. One has the coils mounted on a passive two degree-of-freedom mechanism (a gimbal) with the magnets on the outside, called the internal coil motor. The other has the magnets mounted on the gimbal with the coils on the outside, called the external coil motor. The relative amounts of current put through the three coils create a magnetic vector, of any selected orientation, that moves the motor by aligning the magnetic vector with the fixed magnetic field.

The motor may be operated open-loop without position encoding because the motor is an absolute positioning device. This means that for a given set of currents, the motor will always move to exactly the same position. Initial calibration is necessary to determine the currents necessary to move the motor to a precise position. If more accurate positioning and quicker settling time is desired, the motor can be run closed-loop with feedback from the back-emf on the coils, which is proportional to the velocity of the motor.

Alternatively, position feedback could be used which is obtainable with search coils. These are small stationary coils of wire placed on the permanent magnet (in either design) which have an induced current proportional to the change of magnetic field through the coil. By using pulse-width modulation current control, the current and thus magnetic field, is always changing. The induced current in the search coil is proportional to the angle between the motor coil and itself. This is equivalent to the motor position. Because there are three motor coils, three search coils placed orthogonally or linearly independent to each other would have to be used. Or, one search coil could be used by sequentially operating the three motor coils and thus picking up one coil position at a time.

The 2-D motor is preferably controlled by a microcomputer based controller system which uses pulse-width modulated pulses to the three motor coils.

The software control of the motor is simple because the motor mechanism is designed to have a unique solution to the forward kinematics problem. Because the inverse kinematics problem is not very difficult, it can be computed on the fly, or preferably a digital memory look-up table (RAM or ROM) can be used.

OBJECTIVES AND FEATURES OF THE INVENTION

It is an objective of the present invention to provide a pointer motor which may be relatively small, of less then one-cubic inch, and yet provide accurate and reproducable tilt and pan movements.

It is a further objective of the present invention to provide such a motor that has sufficient torque to move a load of 0.5 oz. at a rapid speed, of 300°/sec.

BRIEF DESCRIPTION OF THE DRAWINGS

Other objectives and features of the present invention will be apparent from the following detailed description, taken in conjunction with the accompanying drawings. In the drawings.

DETAILED DESCRIPTION OF THE INVENTION

Figure 2A:
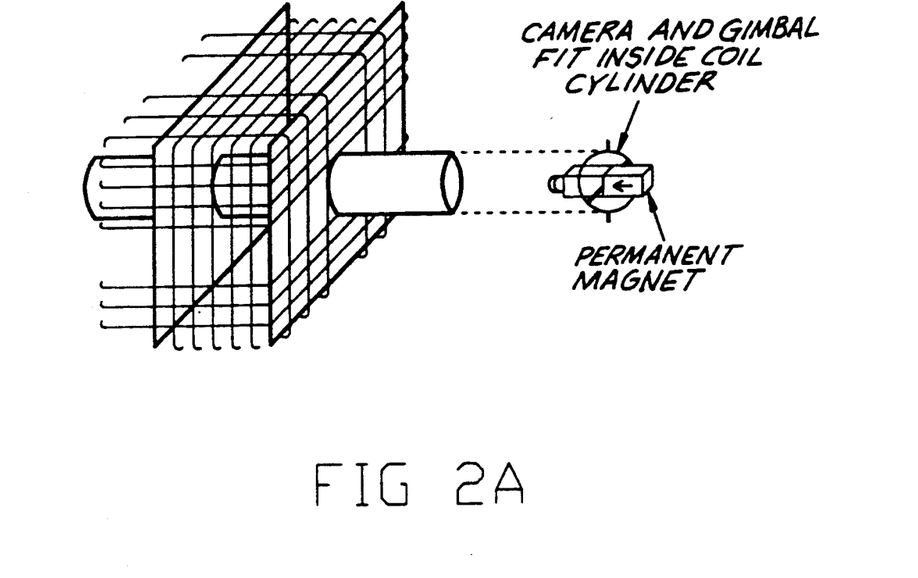
FIG. 2A is a perspective view, partially broken away, of the external coil embodiment of the motor.

The following detailed description is of the 2-D motor of the present invention. That description is in the context of a pointer motor having a rotor which carries and points a CCD (Charge Coupled Device) of 192×165 pixels (31,680 total) with a lens assembly weighing about 0.5 ounces (see FIG. 2A). However, the motor may also be used as a pointer motor for heat sensitive devices or other sensor devices and may also be used in robot devices to simulate a joint, for example a leg joint for walking.

Figure 1A:
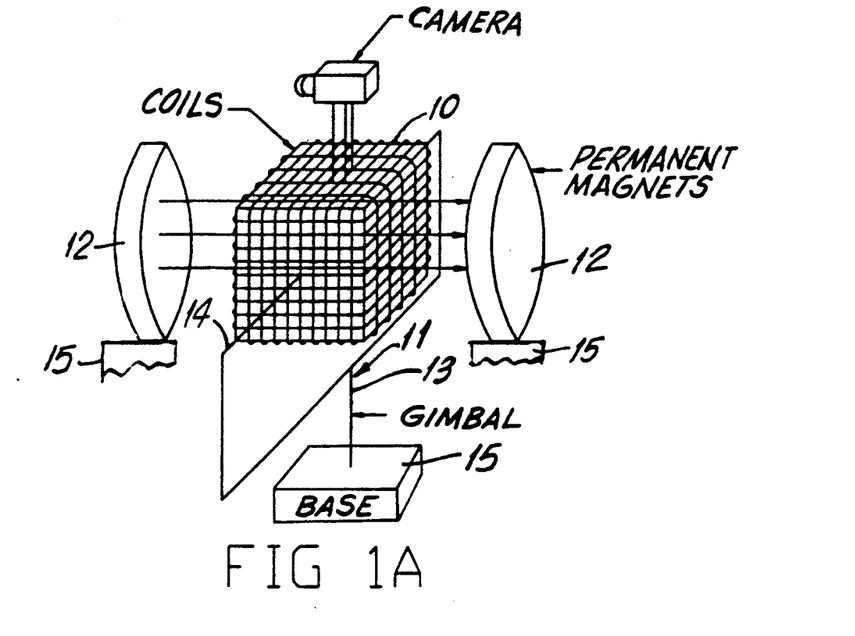
FIG. 1A is a perspective view of the internal coil embodiment of the 2D motor of the present invention shown in its home position.
Figure 2B:
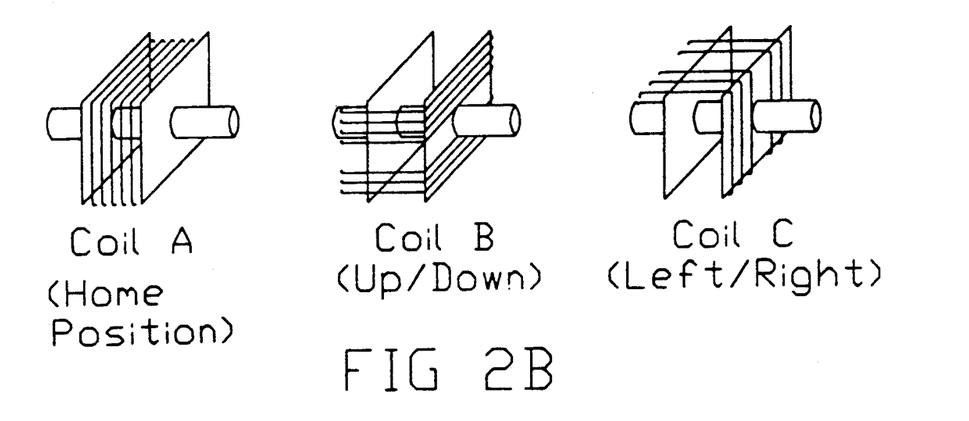
FIG. 2B is a perspective view of the three coils of FIG. 2A showing their orientation.

There are two approaches to implementing a 2-D motor which are illustrated in the accompanying figures. A diagram illustrating the first approach is shown in FIG. 1A and positions coils 10 on the inside mounted on a gimbal 11 and with the magnets 12 on the outside in a fixed position. The gimbal 11 and magnets 12 are mounted on base 15. The gimbal has a first axle 13 and a second axle 14 orthogonal to the first axle 13 and rotatably mounted thereon. The axles 13 and 14 are mounted on bearings. The other approach positions the permanent magnets on the in on a gimbal and surrounded by fixed coils. With this approach, the coils are wound in such a way as to leave a visual path free for a camera to see out of diagram illustrating this second approach is given in FIGS. 2A and 2B.

Both of these designs are constrained by two critical principles that affect the range of motion of the motor. Both designs are meant to be used as pointing devices. As such, they have an initial resting or "home position" which is normally defined as looking straight ahead. The motor can then make pan (actuate sideways) or tilt (yaw) excursions of limited extent from the home position. The design constraints are:

1. The permanent magnets must be positioned so that the field they define is orthogonal to both axes of rotation of the gimbal when it is in home position.
2. The camera must be positioned on the motor so that its optical axis is orthogonal to both axes of rotation of the gimbal when it is in home position. Note that this is equivalent to being aligned with the magnetic field if the first design constraint is satisfied.

These constraints are due to the facts that the motor is constrained to two mechanical degrees of freedom and that the motor rotation can not be controlled about an axis aligned with the permanent magnetic field.

The force on the coils comes from the basic electromagnetic principle that there is an induced force on a current-carrying wire in a permanent magnetic field. That force is a torque on a current-carrying wire loop in a permanent magnetic field in such a direction that the loop will move to make the normal to the plane of the loop align with the magnetic field. This is shown in FIGS. 3A and 3B.

Figure 3A:
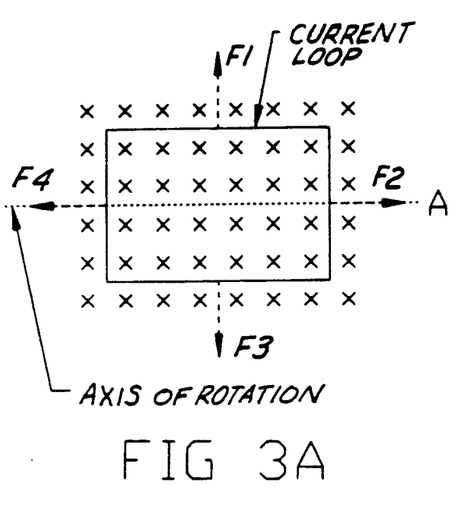
FIG. 3A is a diagram of a single coil in a permanent magnetic field, showing the basic electromagnetic principle.
Figure 3B:
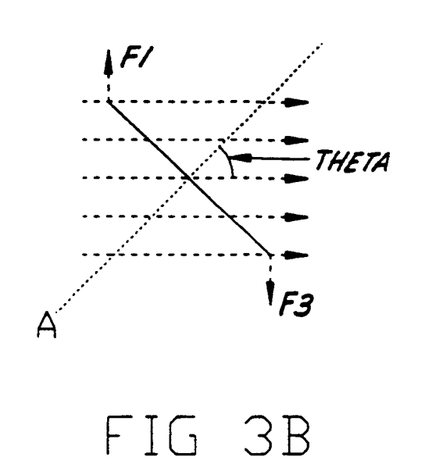
FIG. 3B is a diagram similar to that of FIG. 3A but from the side.

As shown in FIG. 3A the torque is shown on a current loop (coil) horizontal axis A with clockwise current. The magnetic field is going into the page. Forces $F_2$ and $F_4$ are in the direction of the axis A and produce no movement. Forces $F_1$ and $F_3$ rotate the coil about the axis A so that the coil encloses as many magnetic field lines as possible, which occurs when the normal to the plane of the coil is aligned with the magnetic field. FIG. 3B shows the same loop as in FIG. 3A, but viewed from the side.

The force on a current-carrying wire is $F = i\bar{l} \times \bar{B}$ where $i$ is the current in the wire, $l$ is the length of the wire in the magnetic field $\bar{B}$. The magnitude of the torque t on a loop of wire is $t = iA \times B$ or $$|t| = |i||A||B| \sin \theta \qquad (\text{Eq. 1})$$

where A is the area of the coil in the magnetic field. Finally, N loops of wire multiplies the torque by N.

The torque is maximum when $\theta = 90$ and drops to nothing when $\theta = 0$. When the coil is at position $\theta = 0$, it is at its minimum potential energy and thus there is no force on it in any direction. Because of this relationship between torque and angle, the friction of the bearings is very important and must be minimized. The precision of the motor is inversely proportional to the amount of friction in the bearings. This is because fine movements of the motor occur at very small angles where the torque is very small, and such fine movements must still overcome the friction of the bearings.

FIG. 1 illustrates the first design constraint. If this constraint is satisfied, then it is possible to both pan and tilt the motor. Energizing coils A and B control the tilting while coils B and C control the panning.

Figure 4B:
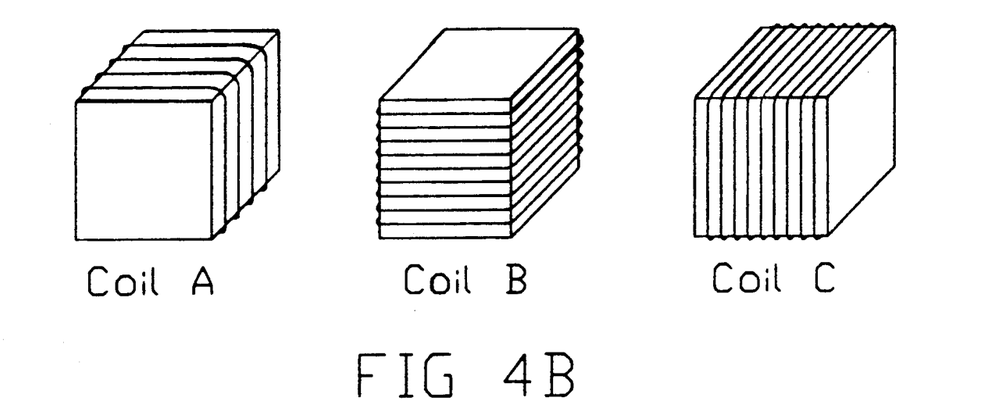
FIG. 4B shows the coil labels for the motor in the position shown in FIG. 4A.
Figure 5:
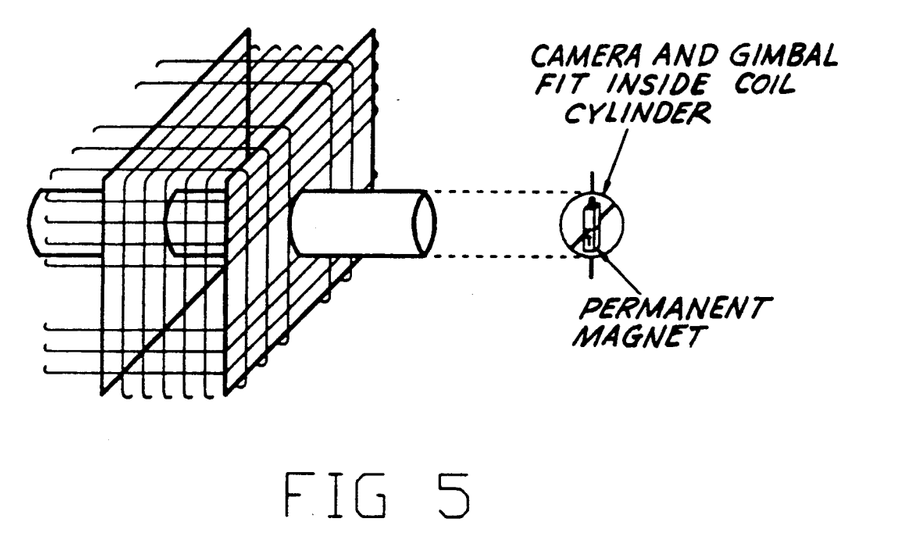
FIG. 5 shows a view similar to that of FIG. 4A, but with the external coil motor panned 90°.

When the motor has panned 90°, it is no longer possible to control the tilt. Notice that coil B has kept is original orientation with respect to the magnets in this position, but coils A and C have their relative orientation. This is depicted in FIG. 4B for the internal coil motor and the analog for the external coil motor is shown in FIG. 5. One way to reach this position is to energize coil C while turning off coils A and B. The pan angle is controlled, but the tilt angle is unspecified, and in fact, there is no way to control the tilt angle in this orientation. This is described mathematically below.

Figure 4A:
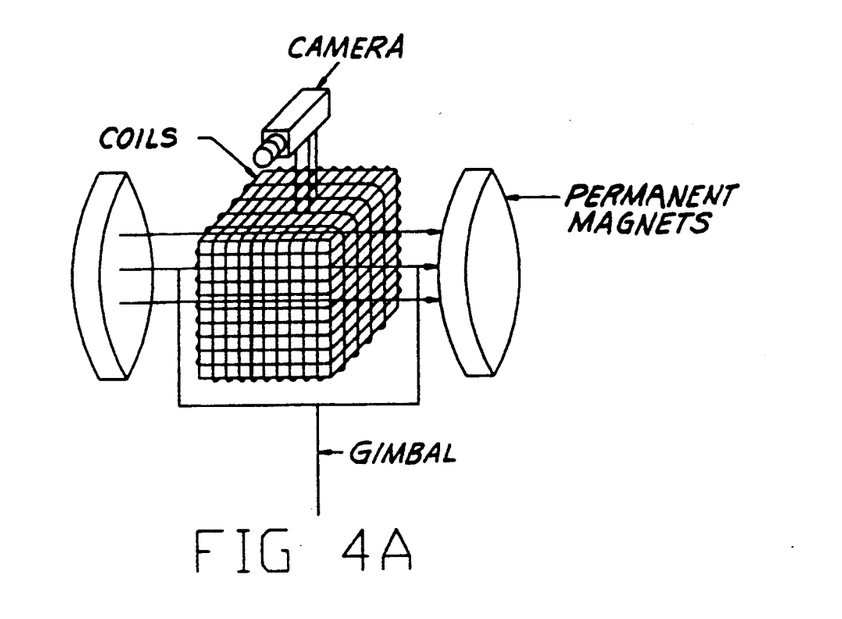
FIG. 4A shows the internal coil motor panned 90°.

FIG. 4A shows the internal coil motor panned 90° so that tilting is not possible. FIG. 4B show the coil labels for the motor in this position. Notice that coils A and C have swapped orientations.

Without the first design constraint the home position could be as depicted in FIG. 4 in which case the motor could not be tilted along the vertical meridian.

The second design constraint arises from the fact that we assume the two degrees of freedom desired for the camera are pan and tilt (yaw). If instead roll (rotation about the optical axis) and either pan or tilt is desired, then the second design constraint is not necessary.

The second design constraint is more straightforward and stems directly from the mechanical degrees of freedom which are available. If the camera is aligned with one of the rotational axes then the camera will roll around that axis. The camera is on the stalk in FIG. 1 because it is necessary to look in the direction of the magnets, but the magnets are in the way. This gives the external coil motor a clear advantage because the camera is located in the center of the motor. This not only decreases the moment of inertia, but allows the camera to be rotated around the center of the sensor which is usually desired for machine vision applications.

FIG. 5 shows the external coil motor panned 90° so that tilting is not possible. This is because the magnetic axis and one of the rotation axes are aligned. It is impossible to produce x-y torque around an axis that is aligned with the permanent magnetic field.

POSITION AND CURRENTS

It is highly desirable, in many applications, that the motor orientation correspond to a set of applied currents. Because the motor is an absolute positioning device, once a set of currents is applied, torque will be created and the motor will turn to the position of lowest potential energy that results in there no longer being any torque.

From Equation 1, we know that the torque on a coil is proportional to the sine of the angle between the normal to the coil plane and the magnetic field. Now we make one modification by using u, the magnetic dipole moment. The magnitude of u is NiA and it lies along the axis perpendicular to the plane of the coil. N is the number of coil turns (loops of wire), i is the current and A is the area of the coil in the magnetic field. Its direction is specified by curling the fingers of the right around the coil in the direction of the current. The extended right thumb will then point in the direction of u. Since N and A are constants for a given coil, we will combine them with the constant C=NA, where N is the number of coil turns and A is the area of the coil in the magnetic field. Finally, the torque can then be defined as.

$$t = \bar{u} \times \bar{B}$$

From this, we see that if $\bar{u}$ is aligned with $\bar{B}$ (magnetic field), pointing in either the same or the opposite direction, there is no torque. However, when they are pointing in the same direction, the potential energy is minimum and the coil is in a stable resting state. If they are pointing in opposite directions, the potential energy is maximum and the coil is in an unstable resting state. If the coil is slightly perturbed, it will swing around 180° to reach the minimum potential energy state. The torque on a single coil is shown in FIGS. 6A and 6B as it is rotated $\pm 180°$ around $\theta$ and $\Phi$.

Figure 6A:
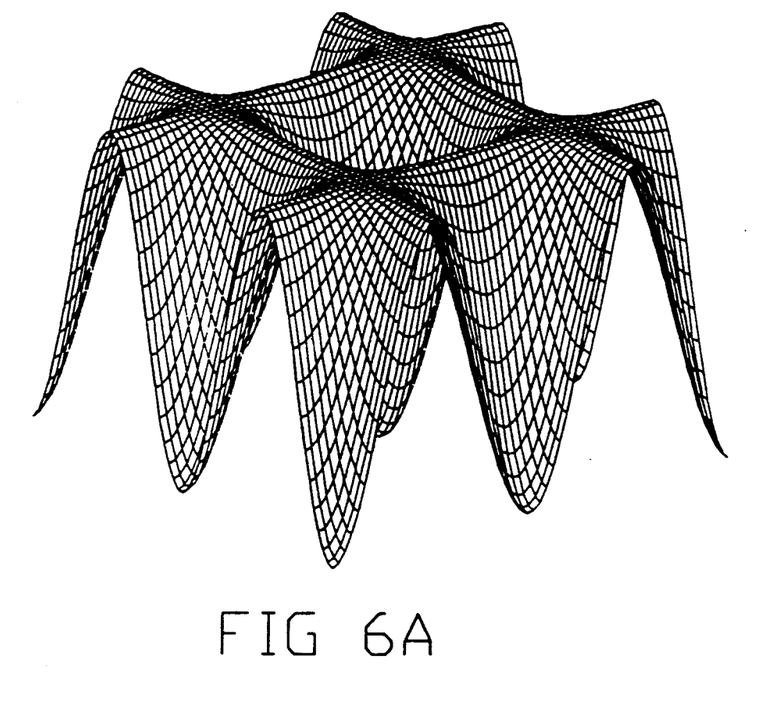
FIG. 6A shows the magnitude of the torque on a single coil.
Figure 6B:
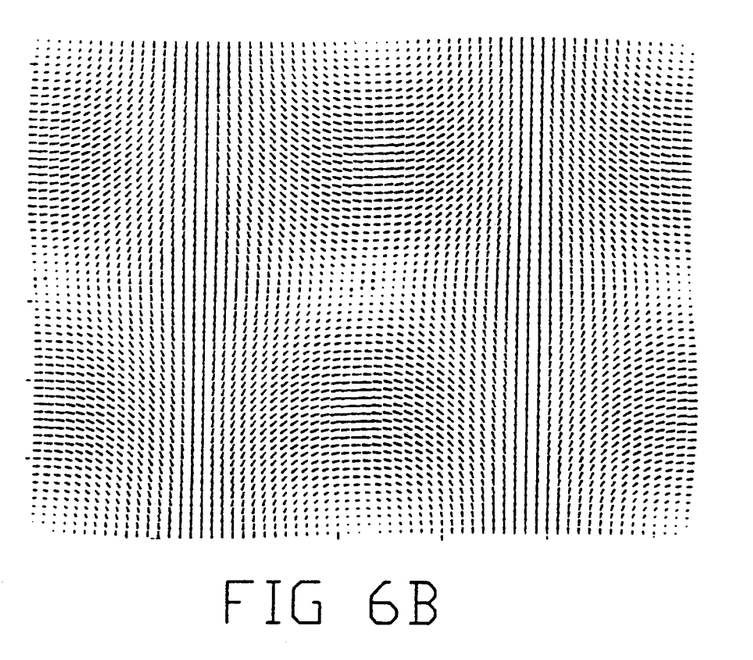
FIG. 6B is a chart showing the magnitude and orientation of the same torques as in FIG. 6A.

FIG. 6A shows the magnitude of the torque on a coil with applied current as the coil is rotated $\pm 180°$ about $\theta$ and $\Phi$. Home position is in the center of the plot. FIG. 6B shows the magnitude and direction of the torque on a coil as in FIG. 6A.

We will use the internal coil motor as an example, but the following derivation applies also to the external coil motor. Here, we talk about torque on the coils for the internal coil motor, but an equal torque acts on the magnets for the external coil motor. For example, the torque on coil A for the internal coil motor is equivalent to the torque on the magnets due to coil A for the external coil motor.

Figure 1B:
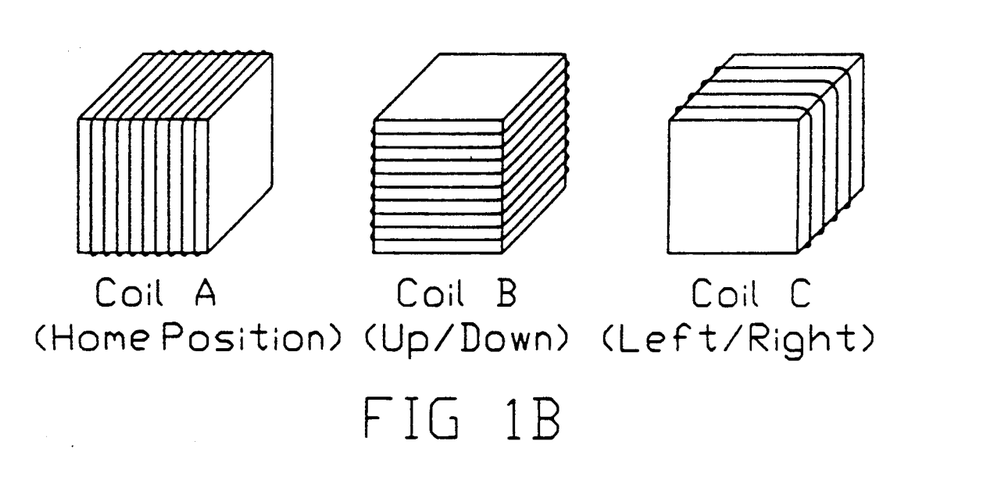
FIG. 1B is a perspective view of the three coils showing their orientation.

We will use the coil labels shown in FIG. 1B. As the torque on each coil is dependent on the motor orientation, it is possible to calculate when the sum of the torques on all three coils vanishes. The final position is determined by $$\tau_A + \tau_B + \tau_C = 0. \qquad (3)$$

where is torque and A, B and C are the coils as shown in FIG. 1B.

Figure 7:
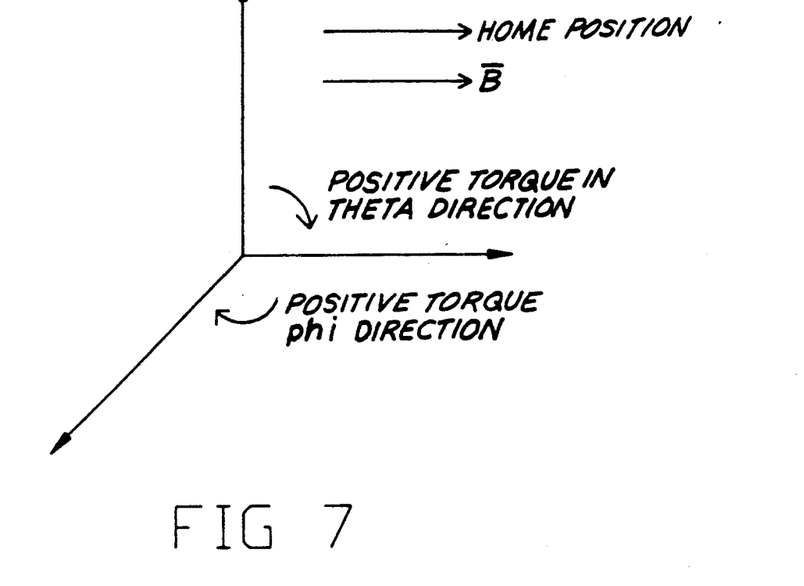
FIG. 7 is the coordinate system used for calculations.

We define the coordinate system we will use in FIG. 7. Here, both the permanent magnetic field and the home position are defined to lie along and in the direction of the positive x-axis. $\theta$ is defined as the positive rotation about the z-axis and $\Phi$ is defined as the positive rotation about the y-axis.

Let us examine the torque on coil A. The magnetic field, $B = (1, 0, 0)$. When the motor is in home position, coil A has the magnetic dipole moment, $u_A = C_A i_A (1, 0, 0)$, where $C_A = (N_A = \text{number of turns in coil A}) \times (A_A = \text{Area of Coil A})$ and $i_A$ is the current in coil A. To calculate the torque on coil A at position $(\theta, \Phi)$, we rotate $u_A$ by $\theta$ around the z-axis and then by $\Phi$ around the y-axis.

$$\bar{\mu}_A = C_A i_A (1, 0, 0) \cdot [rot_Z(\theta)] \cdot [rot_Y(\Phi)]$$
$$= C_A i_A (\cos\theta\cos\Phi, \sin\theta, -\cos\theta\sin\Phi)$$

Then, $$\tau_A = \bar{\mu}_A \times \bar{B}$$
$$= C_A i_A (0, -\cos\theta\sin\Phi, -\sin\theta)$$

FIG. 7 shows the coordinate system used for calculations. The permanent magnetic field and the home position both lie along and in the direction of the positive x-axis.

We can calculate the torque for coils B and C similarly.

$$\bar{\mu}_B = C_B i_B (0, 1, 0) \cdot [rot_Z(\theta)] \cdot [rot_Y(\Phi)]$$
$$= C_B i_B (-\sin\theta\cos\Phi, \cos\theta, \sin\theta\sin\Phi)$$

$$\tau_B = \bar{\mu}_B \times \bar{B}$$
$$= C_B i_B (0, \sin\theta\sin\Phi, -\cos\theta)$$

and $$\tau_B = C_c i_c \bar{\mu}_B \times \bar{B}$$
$$= C_c i_c C_B i_B (0, \sin\theta\sin\Phi, -\cos\theta)$$

$$\tau_C = \bar{\mu}_C \times \bar{B}$$
$$= C_c i_c (0, \cos\Phi, 0)$$

Where $$C_B i_B = (N_B \times A_B) i_B$$

and $C_c i_c = (N_c \times A_c) i_c$ are defined similarly to $C_A i_A$ above.

Where $C_B i_B = (N_B \times A_B) i_B$ and $C_c i_c = (N_c \times A_c) i_c$ are defined similarly to $C_A i_A$ above.

Finally, we calculate the position using Equation 3.

$$C_A i_A (0, -\cos\theta\sin\Phi, -\sin\theta) + C_B i_B (0, \sin\theta\sin\Phi, -\cos\theta) +$$
$$C_c i_c (0, \cos\Phi, 0) = 0$$

This results in the solution $$\theta = \tan^{-1}\left(\frac{-C_B i_B}{C_A i_A}\right) \quad (4)$$

$$\Phi = \tan^{-1}\left(\frac{C_c i_c}{C_B i_B \sin\theta - C_A i_A \cos\theta}\right) \quad (5)$$

Using these definitions for $\theta$ and $\Phi$, we can now prove the first design constraint, that the permanent magnets must be positioned so that the field they define is orthogonal to both axes of rotation of the gimbal when it is in home position. As previously stated, this constraint comes from the fact that when the motor is panned 90° (i.e., $\Phi = 90°$), there is no control of the tilt (i.e., $\theta$ is undefined).

Using Equation 5, set $\Phi = 90°$ $$\tan^{-1}\left(\frac{C_c i_c}{C_B i_B \sin\theta - C_A i_A \cos\theta}\right) = 90$$

$$\frac{C_c i_c}{C_B i_B \sin\theta - C_A i_A \cos\theta} = \infty$$

This implies that $i_C \neq 0$ and that $$C_B i_B \sin\theta - C_A i_A \cos\theta = 0$$

$$\tan\theta = \frac{C_A i_A}{C_B i_B}$$

But by Equation 4, $$\tan\theta = \frac{-C_B i_B}{C_A i_A}$$

So, $$\frac{C_A i_A}{C_B i_B} = \frac{-C_B i_B}{C_A i_A}$$

$$(C_A i_A)^2 = -(C_B i_B)^2$$

This is satisfied only when $i_A = i_B = 0$. But by Equation 4, $\tan\Theta$ is defined by $$\frac{-C_B i_B}{C_A i_A}$$

which is undefined when iA = iB = 0. Therefore, when $\Phi = 90°$, $\theta$ is undefined.

Power Dissipation Vs. Torque in the 2D Motor

The current in the coil is controlled by the resistance of the wire, R, and the voltage across the coil V, according to V = iR. The resistance of the wire is directly proportional to its length and inversely proportional to its area. The power dissipated in the motor is $P = i^2 R$.

Thus, the power vs. torque tradeoff is dependent on the number of turns of the coil, the resistance of the coil, the size of the coil, and the voltage across the coil. We now examine how changing these parameters affects the characteristics of the motor. We ignore the effect of the number of turns and the diameter of the wire on the size of the coil.

(i) If one were to increase the number of turns of the coil, N' = 2N, the length of the coil doubles, so the resistance of the coil doubles. Thus, with constant voltage, the current decreases by 2. The power then decreases by 2, and the torque remains the same because the current decrease and the turn count increase cancel each other out.

(ii) If one were to increase the diameter of the wire, D = 2D, the resistance of the coil decreases by 4. Thus with constant voltage, the current increases by 4. The power usage and the torque will increase by 4.

The resistance of the coil can also be changed by using different material. Aluminum has approximately twice the resistance of copper. So substituting aluminum wire for copper would double the resistance. The current would decrease by 2. Then the power usage and the torque would decrease by 2.

(iii) If one were to increase the radius of the coil, r=2r, keeping the voltage and the number of turns constant, the resistance of the coil doubles and thus the current halves. The power usage decreases by 2, but the torque increases by 2 since the area of the coil increases by 4.

(iv) If one were to increase the voltage across the coil. V=2V, the current doubles and thus power increases by 4. The torque, however, just doubles.

These parameters are summarized in the following table:

| Parameter | Change | Resulting Power | Resulting Torque |
|---|---|---|---|
| Number of coils, N | $N' = 2N$ | $P' = \frac{1}{2}P$ | $\tau' = \tau$ |
| Diameter of wire, D | $D' = 2D$ | $P' = 4P$ | $\tau' = 4\tau$ |
| Radius of coil, $\tau$ | $r' = 2r$ | $P' = \frac{1}{2}P$ | $\tau' = 2\tau$ |
| Voltage across wire, V | $V' = 2V$ | $P' = 4P$ | $\tau' = 2\tau$ |

If one wants to design the motor with as much torque as possible while maintaining as small a size and using as little power as possible, then increasing the size of the coil is best in terms of power and torque. But for a given maximum size, the options are limited. Torque can be increased by increasing either the voltage or the diameter of the wire. This would then have to be countered by increasing the number of coils to maintain torque while keeping the power dissipation down. Preferably the magnets, in both the internal and external coil embodiments, are high energy density magnets (BH max, B being the magnetic field (magnetic flux density) and H being the applied magnetic field, most preferably a rare earth magnet, for example neodynium-iron-boron or samarium-cobalt.

Controller; System and Prototype

The 2D motor is controlled by limiting the amount of current in each coil. This can be done either by regulating the voltage on the coils, by using a constant voltage with a Pulse-Width Modulation (PWM) technique, or by using a variable current source. The PWM method is preferred, although the variable current source technique has the advantage that the currents, and thus the motor position, are independent of the temperature of the motor.

Figure 8:
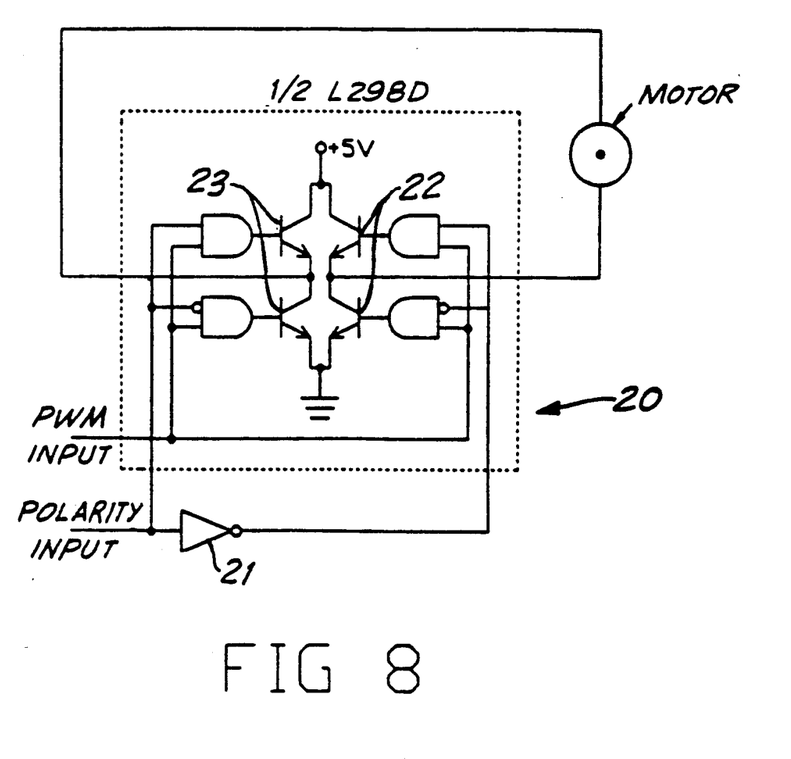
FIG. 8 is a driver circuit for one coil of the motor.

Pulse-Width Modulation means driving the motor with a square wave with a variable period, i.e. variable width pulses having the same amplitude. The percentage of the period where the supply is high is called the "duty cycle". A duty cycle of 0 gives no current to the motor while a duty cycle of 100 gives maximum current. Because the motor has inertia, it does not respond to the choppiness of the current supply as long as the frequency is high enough. The motor effectively acts as an integrator of the current. As described below, the preferred motor controller is a one chip microcomputer (single integrated circuit), such as M68332 (Motorola). The M68332 supplies the PWM signal as described below. The PWM signal is amplified to drive the motor using a standard Darlington-pair power transistor, such as L298D (Unitrode). AS shown in FIG. 8 the driver circuit includes inverter 21, a first Darlington pair power transistors 22 and second Darlington pair power transistors 23.

The polarity of the voltage on the coil also needs to be controlled in order to position the motor everywhere on the unit sphere. Without changing the polarity, only one octant of space would be accessible. The driver circuit for one coil is shown FIG. 8.

By holding the currents to the three coils constant, the motor can be held at any given position. The simplest way to move the motor would just be to change the currents to the values representing the new position. This approach, however, results in poor performance as the motor will ring (oscillate) around the new position and can take as long as a second to settle.

This problem can be overcome by changing the currents and smoothly moving the motor from the original to the final position in small increments. In addition, this motion should be fast at the beginning and should slow down smoothly as the final position is approached. This technique yields fast movement without a ringing problem. In one prototype, the M68332 chip is used in a very small single-based computer called the Business Card Computer (BCC) supplied by Motorola. The BCC holds the 16.77 MHz M68332 chip, a 64 K×16 EPROM with a monitor, 2 16 K×8 RAM chips, and a transceiver for the serial ports. The board is made with surface-mount technology and its dimensions are 3.5×2.25 in.

Figure 9:
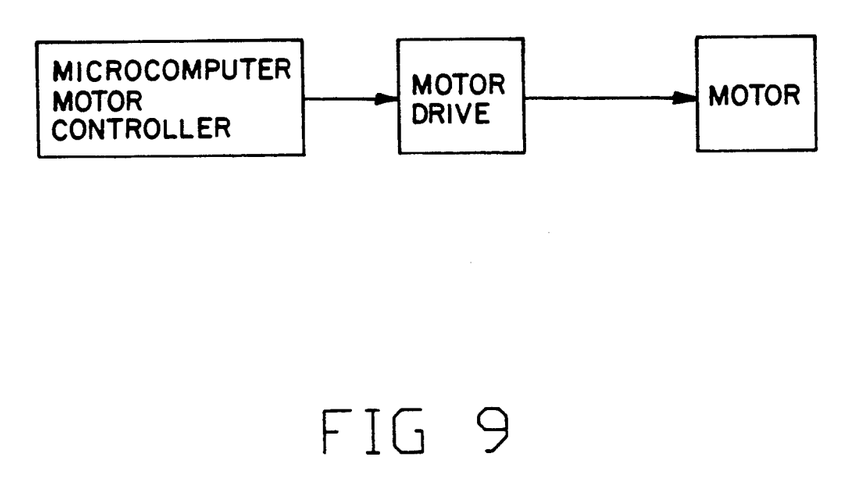
FIG. 9 is a block schematic diagram of the motor controller system.

The 2D motor system consists of three components as depicted in FIG. 9. It consists of the microcontroller the motor driver, and the spherical-motor.

The microcontroller generates the pulse-width modulated signal that controls the position and movement of the motor. The motor driver amplifies the PWM signal from the microcontroller to supply enough current to drive the motor.

We have built two prototype motors, one internal coil and one external coil.

The internal coil motor has dimensions of 2.25"×3.25"×4.50". It is large enough to hold large permanent magnets and a good magnetic return path resulting in a large torque. The maximum torque at 15 V is approximately 5 oz. in.

The external coil motor has dimensions of 1.50"×2.00"×2.25". The rotor consists of a permanent magnet neodynium-iron-boron or samarium-cobalt which is 0.25"×0.25"×0.40". It yields approximately 1 oz. in torque at 15 V which is sufficient to move a CCD sensor with a lens assembly at a maximum speed of approximately 300°/second.

We claim:

1. A two-dimensional motor comprising:
   (a) a rotor body;
   (b) a first conductive coil wound around and on said rotor body and laying in a first plane;
      a second conductive coil wound around and on said rotor body and laying in a second plane;
      a third conductive coil wound around and on said rotor body and laying in a third plane;
      said first, second and third planes being linearly independent to each other;
   (c) a base to support portions of the motor;
   (d) a magnetic field means mounted on said base to produce a directed magnetic field through said rotor body an to induce torque on said rotor body when current flows in said coils;
   (e) gimbal means mounted on said base to pivotly mount said rotor body to provide both tilting motion and panning motion to said rotor body;
   (f) current means to provide selected electrical current to said coils and to thereby control the tilting and panning movement of the rotor body.

2. A motor as in claim 1 wherein the planes of the coils are orthogonal to each other.

3. A motor as in claim 1 wherein the rotor body carries a charge coupled device.

4. A motor as in claim 1 wherein said two-dimensional motor is less then one cubic-inch in size.

5. A motor as in claim 1 wherein said gimbal means includes a first axle rotatably mounted therein and a second rotatably mounted axle orthogonal to the first axle; said rotor body being fixed to said second axle.

6. A motor as in claim 1 wherein said magnetic field means includes a rare earth magnet.

7. A motor as in claim 6 wherein the magnet is selected from neodynium-iron-boron and samarium-cobalt.

8. A motor as in claim 1 wherein said current means includes controller means to supply pulse-width modulated current pulses individually to each coil.

9. A motor as in claim 1 which is a pointer motor wherein said tilting motion is a maximum of 180° and said panning motion is a maximum of 180°.

10. A motor as in claim 1 wherein the magnetic field means includes two permanent magnets positioned on said base and being on opposite sides of said rotor body.

11. A motor as in claim 7 wherein said base is a magnetic flux return path for said magnets.

12. A two-dimensional motor comprising
(a) a rotor body having a permanent magnet;
(b) a first, a second, and a third conductive coils wound to surround the rotor body and spaced therefrom; the first, second and third conductive coils laying in respective first, second and third planes, and the first, second and third planes being linearly independent to each other;
(c) gimbal means mounted to pivotly mount the rotor body to provide both tilting and panning action to said rotor body and;
(d) current means to provide selected electrical current to said coils and to thereby control the tilting and panning action of the rotor body.

13. A motor as in claim 12 wherein the planes of the coils are orthogonal to each other.

14. A motor as in claim 12 wherein the rotor body carries a charge coupling device.

15. A motor as in claim 12 wherein said two-dimensional motor is less than one cubic inch in size.

16. A motor as in claim 12 wherein said magnet is a rare earth magnet.

17. A motor as in claim 16 wherein said magnet is selected from neodynium-iron-boron and samarium-cobalt.

* * * * *